United States Patent
Kerleau et al.

(10) Patent No.: US 8,772,191 B2
(45) Date of Patent: Jul. 8, 2014

(54) PROCESS FOR THE OFF SITE REGENERATION OF SOLID CATALYSTS

(75) Inventors: Philippe Kerleau, Valence (FR); Pierre Dufresne, Valence (FR)

(73) Assignee: Eurecat S.A., La Voulte-sur-Rhone (FR)

( * ) Notice: Subject to any disclaimer, the term of this patent is extended or adjusted under 35 U.S.C. 154(b) by 225 days.

(21) Appl. No.: 13/344,887

(22) Filed: Jan. 6, 2012

(65) Prior Publication Data

US 2012/0231947 A1 Sep. 13, 2012

Related U.S. Application Data

(60) Provisional application No. 61/440,218, filed on Feb. 7, 2011.

(30) Foreign Application Priority Data

Jan. 11, 2011 (FR) ...................................... 11 50198

(51) Int. Cl.
| | |
|---|---|
| *B01J 38/48* | (2006.01) |
| *B01J 38/56* | (2006.01) |
| *B01J 38/04* | (2006.01) |
| *B01J 38/44* | (2006.01) |
| *B01J 38/12* | (2006.01) |
| *B01J 38/02* | (2006.01) |
| *B01J 38/10* | (2006.01) |
| *B01J 38/68* | (2006.01) |
| *B01J 29/90* | (2006.01) |
| *B01J 23/96* | (2006.01) |
| *B01J 23/75* | (2006.01) |
| *B01J 23/882* | (2006.01) |
| *B01J 23/883* | (2006.01) |
| *B01J 23/90* | (2006.01) |
| *B01J 23/94* | (2006.01) |
| *B01J 38/00* | (2006.01) |

(52) U.S. Cl.
CPC *B01J 38/02* (2013.01); *B01J 38/10* (2013.01); *B01J 38/12* (2013.01); *B01J 38/56* (2013.01); *B01J 38/68* (2013.01); *B01J 29/90* (2013.01); *B01J 23/96* (2013.01); *B01J 23/75* (2013.01); *B01J 23/882* (2013.01); *B01J 23/883* (2013.01); *B01J 23/90* (2013.01); *B01J 23/94* (2013.01); *B01J 2038/005* (2013.01)
USPC ................. 502/22; 502/31; 502/34; 502/37; 502/38

(58) Field of Classification Search
CPC ........ B01J 23/882; B01J 23/883; B01J 23/90; B01J 23/94; B01J 29/90; B01J 23/96; B01J 38/02; B01J 2038/005; B01J 23/75; B01J 38/10; B01J 38/12; B01J 38/56; B01J 38/68
USPC ...................................... 502/20–56
See application file for complete search history.

(56) References Cited

U.S. PATENT DOCUMENTS

| | | |
|---|---|---|
| 5,047,377 A | 9/1991 | Erpenbach et al. |
| 2003/0144366 A1* | 7/2003 | Daage et al. ................. 518/715 |
| 2008/0038159 A1 | 2/2008 | Demirel et al. |
| 2012/0231947 A1* | 9/2012 | Kerleau et al. ................. 502/31 |

FOREIGN PATENT DOCUMENTS

| | | |
|---|---|---|
| DE | 2853065 A1 | 6/1980 |
| JP | 2000093805 A | 4/2000 |
| WO | 01/66214 A1 | 9/2001 |
| WO | 03/064034 A2 | 8/2003 |
| WO | 03/064356 A1 | 8/2003 |

OTHER PUBLICATIONS

EPO form 1503, FR, Jun. 16, 2011, French Search Report for 1150198.
Form 237, FR, Jun. 16, 2011, Written Opinion for 1150198.

* cited by examiner

*Primary Examiner* — Jennifer A Smith
(74) *Attorney, Agent, or Firm* — Saul Ewing LLP; Peter C. Lauro, Esq.

(57) ABSTRACT

The invention provides a process for the off site regeneration of a solid catalyst, comprising two consecutive steps:
- a first step of washing the catalyst using one or more fluid(s) in the supercritical state, so as to extract from the catalyst at least a portion of the hydrocarbons present at the surface of the latter, followed by
- a second step of combustion of at least a portion of the coke present at the surface of the said catalyst by a heat treatment of the latter in the presence of oxygen and at a temperature ranging from 300° C. to 600° C.

20 Claims, No Drawings

PROCESS FOR THE OFF SITE REGENERATION OF SOLID CATALYSTS

RELATED APPLICATION

This application claims priority to U.S. provisional application Ser. No. 61/440,218, filed Feb. 7, 2011 and French application Serial No. 11 50198, filed Jan. 11, 2011, the entire disclosures of which are incorporated herein by this reference.

The present invention relates to a process for regenerating spent catalysts intended for the treatment of hydrocarbons in the field in particular of oil refining and petrochemicals.

The present patent application relates more specifically to a process intended to regenerate spent catalysts employed in processes for the conversion of hydrocarbons, in order to restore to them a satisfactory level of activity at least approaching that of a fresh catalyst.

The processes for the treatment of hydrocarbons carried out in refineries and/or petrochemical units involve specific catalysts which are porous solids with a high specific surface (typically from 50 to 500 $m^2/g$) and with a high pore volume (from 0.1 to 0.7 liters/Kg).

The most commonly employed catalysts comprise a porous support based on one or more refractory inorganic oxides, on which are deposited one or more catalytically active metals generally comprising one or more metals from Group VIII of the Periodic Table of the Elements, sometimes in combination with one or more other metals, in particular from Group VIb. Such catalysts are employed in particular in hydrocrackding, reforming, hydrogenation and hydrotreating processes, such as hydrodesulphurization, hydrodenitrogenation, hydrodearomatization or hydrodemetallization processes.

Use is also made, for example in. alkylation and polymerization processes, of catalysts based on zeolites.

During their use, these catalysts gradually deactivate, in particular due to the deposition of coke at their surface, that is to say of a mixture comprising more or less heavy hydrocarbons, carbon residues and sometimes metallic impurities. These coke deposits reduce the porosity of the catalyst, block access to the catalytically active sites and deactivate the latter.

For the sake of economy and preserving the environment, there is henceforth a search to reuse these catalysts after their cycle of use.

"Regeneration" processes have thus been developed which consist in treating the spent catalysts in order to restore their activity to a level sufficient to allow them to be reemployed.

The regeneration of spent catalysts is conventionally carried out by combusting the coke, the catalyst being heated to a high temperature in the presence of a gas comprising oxygen.

It can be carried out in situ (that is to say, directly in the unit in which the catalyst is employed, after shutting it down) or ex situ,—that is to say off site, after discharging the catalyst from the unit.

Before combusting the coke, it is normal to carry out a first step of removal of the most volatile hydrocarbons and impurities (or "free hydrocarbons") present—at the surface of the catalyst.

This is because it is preferable not to subject the spent catalyst directly to high temperature conditions in an oxygen-comprising environment as the combustion of the free hydrocarbons under such conditions proves to be difficult to control and can trigger phenomena of ignitions or explosions which, in addition to—their dangerous nature, are liable to damage the catalyst.

The two techniques known for this purpose consist, on the one hand, in evaporating the hydrocarbons and, on the other hand, in washing the catalyst using a liquid solvent.

The hydrocarbons are evaporated by heating the catalyst in the presence of a carrier gas, at a temperature suited to the types of hydrocarbons to be removed. Generally, the boiling points of these products lie within the naphtha (80-150° C.), kerosene (150-250° C.) or atmospheric gas oil (250-380° C.) ranges. The evaporation temperature must thus be suited to the types of hydrocarbons to be removed. It is generally between 100 and 500° C.

The carrier gas can be an inert gas, nitrogen, or air depleted in oxygen, indeed even, in some cases, air, at moderate temperature.

The evaporated hydrocarbons subsequently have to be removed from the carrier gas, which can be carried out in an incinerator operating at temperatures in the vicinity of 800° C.

This technology is simple and efficient. Nevertheless, it suffers from a poor energy balance and gives rise to not insignificant emissions of $CO_2$. Specifically, a first point of emission results from the combustion of the gas necessary to heat the catalyst up to the evaporation temperature of the hydrocarbons.

Furthermore, a substantial contribution of energy is necessary for the evaporation of these hydrocarbons, the latent heat of evaporation being not insignificant in the overall balance. The hydrocarbons are then incinerated in an incinerator, which results in another energy expenditure to bring these effluent streams to a temperature of approximately 800° C., even if the combustion of these hydrocarbons contributes to the rise in temperature. This incinerator also results in an additional production of $CO_2$, due to the gas burner and to the actual combustion of the hydrocarbons.

A second disadvantage of the technologies for the evaporation of the hydrocarbons under an inert gas is that they result in additional production of coke at the surface of the catalyst, essentially related to two phenomena.

The first phenomenon is due to the fact that the evaporation is not completely selective. At high temperature under an inert gas, a partial transformation of the hydrocarbons takes place. This chemical reaction, referred to as disproportionation, results both in production of lighter molecules and heavier molecules than the molecules initially present. Under the effect of heat, some molecules are cracked by a thermal cracking process, producing light hydrocarbons.

With regard to the reactions which contribute to increasing the molecular weight, these are alkylation reactions, in particular reactions with the cracked olefinic fragments, and condensation reactions. There is not only an increase in the molecular weight of some hydrocarbons but also a partial change in nature with greater aromatization.

The second phenomenon is the substantial modification in the nature of the carbon (coke) already present on the catalyst: these carbon-based molecules are capable of being modified during heating and of being subjected, inter alia, to partial cracking and to aromatization.

These two phenomena, contribute to increasing the proportion of "hard" coke, which makes the combustion of the coke more difficult, the kinetics of combustion being reduced. On the laboratory scale, this effect can be characterized by a combustion kinetics test.

It is thus apparent that the techniques for the evaporation of hydrocarbons contribute to increasing the time for removal of the carbon and to rendering the evaporation more expensive in terms in particular of energy expenditure, with an increased risk of damage to the catalyst, which has to be subjected to severer combustion conditions (higher combustion temperature and/or greater duration of the combustion step).

A second technique which makes it possible to remove the free hydrocarbons before the combustion of the coke consists in washing the spent catalyst using one or more liquid solvents (technologies referred to as solvent removal of the hydrocarbons). The solvent comprising the hydrocarbons is subsequently evaporated, so as to recover the hydrocarbons and to recycle the solvent.

This technique exhibits the advantage of being able to recover the hydrocarbons in order optionally to make use of them. The $CO_2$ emissions are thus greatly reduced in comparison with an evaporation technique in which these hydrocarbons are incinerated.

Nevertheless, this technology is in practice difficult to operate on the industrial scale, in particular for the off site regeneration of hydrotreating catalysts. This is because the solvents which make it possible both to dissolve the hydrocarbons present and to be able to be separated from these compounds by distillation are typically organic solvents, such as acetone or aromatic solvents (toluene, xylene), which present risk factors in terms of safety and the environment. The use of such solvents makes it a complex business to employ the process and increases both the capital and operating costs thereof.

The present invention is targeted at overcoming the disadvantages of the regeneration processes of the prior art as described above.

The present invention is targeted in particular at providing a process for the off site regeneration of catalysts which is simple and efficient while being reliable in terms of safety and the environment.

The present invention is also targeted at providing a regeneration process which makes it possible to reduce consumptions of energy and to reduce $CO_2$ emissions in comparison with the known processes.

Finally, the process according to the present invention should make it possible to regenerate the catalysts in an efficient manner, in order to restore a level of activity to them as close as possible to that of a fresh catalyst, without damaging them and in particular without reducing their porosity.

On continuing its research studies in the field of the regeneration of catalysts for the treatment of hydrocarbons, the Applicant Company has discovered that these objectives could be achieved by means of an off site regeneration process comprising the combination of two consecutive steps, namely a first step of washing the catalyst with a fluid that is the supercritical state, followed by a second step of combustion of the coke under controlled conditions.

Thus, a subject-matter of the present invention is a process for the off site regeneration of a solid catalyst, comprising the following two consecutive steps:

a first step of washing the catalyst using one or more fluid(s) in the supercritical state, so as to extract from the catalyst at least a portion of the hydrocarbons present at the surface of the latter, followed by a second step of combustion of at least a portion of the coke present at the surface of the catalyst by a heat treatment of the latter in the presence of oxygen and at a temperature ranging from 300° C. to 600° C.

The process according to the invention thus comprises a first step in which the catalyst is washed, that is to say flushed, using a fluid that is in the supercritical state, which makes it possible to extract, from the catalyst, all or a substantial portion of the hydrocarbons and in particular the free hydrocarbons present at its surface;

The term "fluid in the supercritical state" denotes, in a way known per se, a fluid brought beyond its critical temperature and its critical pressure. The properties of such a fluid (density, viscosity, diffusion coefficient, and the like) are intermediate between those of liquids and those of gases.

This makes it possible in particular, for the same fluid, to vary its extraction properties by modifying the temperature and/or pressure conditions, so as to adapt these properties as a function of the nature and/or amount of the hydrocarbons to be extracted and/or to change these properties over time.

The operating conditions for the first step depend on the nature of the supercritical fluid or fluids employed and can vary over-time.

Preferably, the fluid in the supercritical state—is chosen from carbon dioxide, water, -light alkanes- (such as in particular methane, ethane, propane, butane or pentane) and their mixtures. Particularly preferably, this fluid is carbon dioxide.

When the fluid in the supercritical state is carbon dioxide, the first step is carried out at a temperature of greater than or equal to 31° C. and at a pressure of greater than or equal to 7.3 8 MPa (MegaPascal), i.e. $73.8 \times 10^5$ Pa. Preferably, the temperature ranges from 35 to 250° C. and more preferably from 50 to 100° C. Preferably, the pressure ranges from 7.5 to 60 MPa ($75 \times 10^5$ Pa to $600 \times 10^5$ Pa), more preferably from 8 to 40 MPa ($80 \times 10^5$ Pa to $400 \times 10^5$ Pa) and better still from 8 to 20 MPa ($80 \times 10^5$ Pa to $200 \times 10^5$ Pa).

Under these conditions, a certain proportion of water can also be added to the carbon dioxide, which thus makes it possible to modify the polarity properties of the solvent mixture and therefore to modify the extraction properties thereof.

According to a preferred embodiment, the fluid in the supercritical state is carbon dioxide comprising from 1 to 15% by weight of water.

When the fluid in the supercritical state is water in the pure state, the first step is carried out at a temperature of greater than or equal to 374° C. and at a pressure of greater than or equal to 22.3. MPa ($221 \times 10^5$ Pa).

The first step is advantageously carried out by circulating a large amount of fluid in the supercritical state over the solid to be treated, and by recycling said fluid. This amount can be expressed as the ratio of the hourly flow rate by weight of the fluid in the supercritical state to the weight of catalyst, known as WHSV (Weight Hourly Space Velocity), and is expressed in $h^{-1}$. This parameter is advantageously between 10 and 3000 $h^{-5}$ and preferably between 100 and 1000 $h^{-1}$.

The fluid in the supercritical state can be employed pure or as a mixture with one or more cosolvent(s) and/or additive(s), in order to vary its extractive power for the hydrocarbons.

The hydrocarbons extracted using the supercritical fluid can be separated from the latter in a simple way, in particular by varying the temperature and/or the pressure of the fluid, so as to bring about the change of the fluid from the supercritical state to the liquid or gas state.

For example, when the fluid in the supercritical state is carbon dioxide, the carbon dioxide is changed into the gas state and the hydrocarbons extracted are condensed by lowering the temperature and/or the pressure below the critical temperature and/or the critical pressure.

Thus, the hydrocarbons extracted during the first step can be separated from the fluid in a simple and inexpensive way and can be recovered, for example, in order to be made use of.

In addition, the fluid freed from the hydrocarbons is thus easily recovered and is advantageously recycle after changing to the supercritical state, to the first step of the process.

On conclusion of the first step, the catalyst has been efficiently freed from a significant fraction of the hydrocarbons present at its surface and is subsequently directly subjected to a step of heat treatment in the presence of oxygen, during which the coke which was not removed during the first step is combusted.

Strict control of the temperature within the catalyst is essential during this second step. This is because the temperature has to be sufficiently high to make possible the completest possible combustion of the coke. However, it must not exceed 600° C., even locally, as this would have the effect of damaging the catalyst, for example by bringing about a decline in the porosity of the latter.

Preferably, in the second step, the heat treatment is carried out, in all or in part, at a temperature ranging from 350° C. to 550° C.

The temperature within the catalyst can be controlled in a way known per se, for example using thermocouples appropriately positioned in the body of the catalyst.

The second step is carried out in the presence of oxygen, for example using a stream of gas comprising oxygen. This gas can be composed, for example, of air, pure or mixed with additional oxygen or with an inert gas, in particular nitrogen, so as to increase or decrease the oxygen partial pressure above and below the value of 21 kPa.

The oxygen content of the gas is preferably controlled, so as to exert better control over the combustion temperature. This content can be fixed or, on the contrary, can vary over time during the second step.

The gas flow rate is also controlled, so as to control the combustion.

The second step can comprise several phases, carried out at different temperatures and/or in the presence of variable amounts of oxygen.

The total duration of this second step generally depends on the amount of catalyst to be treated, on the composition of the latter, on the amount of coke present at its surface and on the operating conditions (temperature, oxygen content). This duration decreases as the temperature increases. It is generally between 0.05 and 20 hours and preferably between 0.1 and 10 hours.

The second step is advantageously continued until a carbon content of the catalyst of less than or equal to 2% by weight, preferably of less than or equal to 1% by weight and more preferably of less than or equal to 0.5% by weight, with respect to the total weight of the catalyst, is obtained.

According to the invention, the said first and second steps are consecutive, that is to say that the second step is carried out immediately after the first step, without any intermediate step of treatment of the catalyst. Thus, the process according to the invention in particular does not comprise a step of drying the catalyst between the first and second steps. It should be noted that optional storage of the catalyst between the first and the second steps is not regarded as a treatment step.

The combination of the two steps according to the invention has proved to be particularly beneficial. Thus, the first step makes possible efficient removal of the hydrocarbons present at the surface of the catalyst, without formation of additional coke or transformation of the coke already present, which makes it possible to carry out the second step under mild conditions, in particular at a reduced temperature and/or over a shorter period of time.

The propensity of the coke present on the catalyst to be removed can be easily evaluated by a laboratory test. In particular, the kinetics of combustion of the coke present on the catalyst can be evaluated using a standard test which consists in determining the time necessary to lower the carbon content of the catalyst to a value equal to 0.5% by weight, with respect to the total weight of the catalyst.

The test consists in placing the spent catalyst, freed beforehand from the free hydrocarbons, in a preheated furnace, for example at 500° C., which is flushed by a flow of air, and in measuring the rate of disappearance of the carbon as a function of time. This test can be used—in particular to predict and define the operating conditions for the step of combustion of the coke on the industrial scale.

In particular, the process according to the invention has proved to result in better kinetics of combustion of the coke.

In comparison with the regeneration processes of the prior art, the process according to the present invention thus makes possible substantial savings in energy and proves to be more efficient in terms of activity of the regenerated catalyst: the porosity {pore volume, specific surface) of the catalyst and its active sites are preserved, which makes possible better recovery of the activity of the catalyst.

In addition, in comparison with the regeneration processes of the prior art, the process according to the present invention has proved to make it possible to directly regenerate spent catalysts without carrying out a preliminary step of stripping the catalyst, that is to say of washing the latter using a stream of gas, for example steam or nitrogen.

This is because the conventional processes do not make it possible to directly regenerate catalysts highly charged with hydrocarbons, due in particular to the risks of ignitions or explosions. They thus generally require a preliminary step of stripping the catalyst which can be carried out in situ or ex situ.

Thus, the process according to the invention makes it possible, on the one hand, to do without the preliminary stripping step and, on the other hand, to easily recover the corresponding hydrocarbons, in order to make use of them.

According to a preferred embodiment, the catalysts to be regenerated using the process according to the invention comprise from 1 to 40% by weight of hydrocarbons, with respect to the total weight of the catalyst.

The two steps of the process according to the invention can be more or less integrated. The first step can be carried out, for example, in batch mode with just one reactor or several reactors in parallel. In the latter case, the integration with the second step, which is preferably carried out continuously, is easier and makes it possible to reduce the amount of intermediate storage.

The process according to the present invention is carried out off site, that is to say outside the unit in which the catalyst is employed. In other words, the catalyst has to be discharged from the unit, before being regenerated in one or more separate plants using the process according to the present invention.

The regeneration process according to the invention can, in addition to the two steps described above, optionally comprise one or more additional treatment steps carried out before the first step and/or after the second step.

The process according to the invention can thus include one or more final step(s) for activation of the catalyst, the aim of which is to activate the catalytic sites immediately before the catalyst is used.

The process according to the present invention makes it possible to efficiently regenerate any spent catalyst employed in the treatment and/or conversion of hydrocarbons in the fields of oil refining and petrochemicals.

These catalysts are generally provided in the form of small solid particles, such as beads, more or less cylindrical particles, or extrudates. They exhibit a specific surface, measured by the BET method, generally of between 50 and 500 m$^2$/g and preferably between 100 and 300 m$^2$/g, a pore volume, determined by nitrogen adsorption, ranging from 0.25 to 1 ml/g and a mean pore diameter, determined by nitrogen adsorption, ranging from 7 to 2 0 nm.

These catalysts comprise a porous support generally composed of one or more refractory inorganic oxides, such as silicas and/or aluminas, or zeolites, on which may be deposited one or more catalytically active metals chosen, for example, from the metals from Groups VIII and VIb of the Periodic Table of the Elements.

The process according to the invention has thus proved to be particularly effective for the regeneration of catalysts for the hydrotreating and/or hydroconversion of hydrocarbons. The terms hydrotreating and hydroconversion of hydrocarbons denote, in a way known per se, treatments carried out in the presence of hydrogen and which are intended to modify the structure of the hydrocarbon molecules and/or to remove undesirable compounds, such as, in particular, sulphur-based, nitrogen-based, aromatic or metallic compounds, from the mixtures of hydrocarbons. Mention may be made, as nonlimiting examples, of hydrocracking, reforming or hydrogenation processes and hydrotreating processes, such as hydrodesulphurization, hydrodenitrogenation, hydrodearomatization or hydrodemetallization processes.

The catalysts employed in these processes comprise at least one metal from Group VIII of the Periodic Table of the Elements, such as, fox example, cobalt, nickel, iron, platinum or palladium, in combination with at least one metal from Group VIb, such as, for example, molybdenum, tungsten or chromium. The content of metal or metals from Group VIII is generally between 0.1 and 10% by weight, with respect to the total weight of the catalyst, and the content of metal or metals from Group VIb is generally between 1 and 20% by weight, with respect to the total weight of the catalyst.

These metals are deposited on a support based on one or more refractory inorganic oxides, such as, in particular, aluminas, silicas, silica/aluminas, zeolites, zirconias, titanium and boron oxides, and mixtures of such oxides.

In particular, the process according to the invention is particularly appropriate for the regeneration of catalysts comprising CoMo, NiMo, NiW or NiCoMo metal combinations deposited on alumina-based supports.

The process according to the invention has also proved to be particularly effective for the regeneration of catalysts based on zeolites.

The examples which follow are given purely by way of illustration of the present invention.

EXAMPLES

Characterization of the Catalysts

In the examples which follow, the propensity of the coke present on the catalyst to be removed was determined using the following test, which makes it possible to determine the kinetics of combustion of the coke at 500° C.:

A sample of spent catalyst is placed in 4 metal assay crucibles (250 mg of catalyst in each assay crucible), which are themselves placed in a ventilated furnace heated to 500° C. The air stream is high, far above the stoichiometry required by the oxidation reaction, so that the combustion takes place at a constant oxygen partial pressure.

The assay crucibles are withdrawn one by one from the furnace at regular time intervals and the residual carbon content of the catalyst sample is determined. The curve representing the change in the residual carbon content of the catalyst over time is thus drawn up, which curve makes it possible to determine the time necessary to reach a carbon content of 0.5% by weight.

This time, expressed in minutes, is referred to below as "regetest".

In the examples below, the regetest makes it possible, on the one hand, to determine the kinetics of combustion of the coke on the catalyst samples and, on the other hand, constitutes the second step of combustion of the coke present on these same samples.

In the examples below, the carbon and sulphur contents of the catalysts were determined using an "LECO" trade name analyzer and the specific surfaces were determined using the BET method.

The free hydrocarbon contents of the catalysts were evaluated from the variation in weight of a sample subjected to Soxhlet extraction with toluene, followed by drying in an oven at 140° C. The lower detection limit of this method is 0.3% by weight.

Example 1

Comparative

This example was carried out starting from a spent commercial hydrotreating catalyst based on cobalt and molybdenum on an alumina support, comprising 19.3% by weight of hydrocarbons, 25.6% by weight of carbon and 11.4% by weight of sulphur.

This catalyst was subjected to a first step of extraction of the hydrocarbons and volatile compounds under an inert gas, in the following way: 100 g of this catalyst were placed in a tubular furnace at ambient temperature and heated at 450° C. under a stream of nitrogen of 30 Sl/h, a rise in temperature of 10° C./min and then a stationary phase at 4 50° C. for 3 hours being observed.

The catalyst was analyzed on conclusion of this first step: it comprised less than 0.3% by weight of free hydrocarbons, 11.9% by weight of carbon and 12.4% by weight of sulphur.

The "regetest" resulted in a time of 29 minutes.

The regenerated catalyst thus obtained exhibited a carbon content of 0.1% by weight, a sulphur content of 0.4% by weight and a specific surface of 188 $m^2/g$.

Example 2

According to the Invention

This example was carried out starting from the same spent commercial catalyst as that employed in Example 1.

This catalyst was subjected to a first step of extraction of the hydrocarbons and volatile compounds by flushing the catalyst using carbon dioxide ($CO_2$) in the supercritical state, in the following way:

The carbon dioxide is brought above its critical temperature (31° C.) and its critical pressure ($74 \times 10^5$ Pa).

100 g of spent catalyst are placed in a permeable metal assay crucible placed in an extraction device flushed with supercritical $CO_2$ with a flow rate of 200 kg/h, at a temperature of 80° C. and a pressure of 10 MPa ($10 \times 10^5$ Pa) and for an extraction time of 3 hours.

The hydrocarbons, dissolved and entrained by the supercritical CO2 stream, are collected in a separate container, in which the $CO_2$ pressure is lowered so as to cause the $CO_2$ to change to the gas state.

On conclusion of this first step, the catalyst was analyzed: it comprised less than 0.3% by weight of free hydrocarbons, 11.1% by weight of carbon and 12.4% by weight of sulphur.

The "regetest" resulted in a time of 17 minutes.

The regenerated catalyst thus obtained exhibited a carbon content of 0.1% by weight, a sulphur content of 0.4% by weight and a specific surface of 190 m²/g.

Example 3

Comparative

This example was carried out starting from a spent commercial catalyst employed in petrochemicals, based on zeolite and comprising 5.2% by weight of hydrocarbons and 10.2% by weight of carbon.

100 g of this catalyst were subjected to a first, step of extraction of the hydrocarbons and volatile compounds under an inert gas, this step being carried out in a way strictly identical to that described in Example 1.

On conclusion of this first step, the catalyst was analyzed: it comprised less than 0.3% by weight of free hydrocarbons and 9.4% by weight of carbon.

The "regetest" resulted in a time of 82 minutes.

The regenerated catalyst thus obtained exhibited a carbon content of 0.1% by weight and a specific surface of 295 m²/g.

Example 4

According to the Invention

This example was carried out starting from the same spent commercial catalyst as that employed • in Example 3.

100 g of this catalyst were subjected to a first step of extraction of the hydrocarbons and volatile compounds by flushing the catalyst using carbon dioxide ($CO_2$) in the supercritical state, in a way strictly identical to that described in Example 2.

On conclusion of this first step, the catalyst was analyzed: it comprised less than 0-0.3% by weight of free hydrocarbons and 9.1% by weight of carbon.

The "regetest" resulted in a time of 65 minutes.

The regenerated catalyst thus obtained exhibited a carbon content of 0.1% by weight and a specific surface of 299 m²/g.

Example 5

Comparative

This example was carried out starting from a semi-fresh commercial catalyst for the hydrotreating of bottoms, based on nickel and molybdenum on an alumina support.

This catalyst was charged new to an industrial unit and, after being brought into contact with the feedstock, proved to exhibit, from the start, an insufficient effectiveness. This catalyst, impregnated with gas oil, was thus discharged from the unit in order to be regenerated.

It comprised 39.4% by weight of hydrocarbons and 35% by weight of carbon.

100 g of this catalyst were subjected to a first step of extraction of the hydrocarbons and volatile compounds under an inert gas, this step being carried out in a way strictly identical to that described in Example 1.

On conclusion of this first step, the catalyst was analyzed: it comprised less than 0.3% by weight of free hydrocarbons and 5.5% by weight of carbon.

The "regetest" resulted in a time of 12 minutes.

The regenerated catalyst thus obtained exhibited a carbon content of 0.1% by weight and a specific surface of 170 m²/g.

Example 6

According to the Invention

This example was carried out starting from the same semi-fresh commercial catalyst as that employed in Example 5. 100 g of this catalyst were subjected to a first step of extraction of the hydrocarbons and volatile compounds by flushing the catalyst using carbon dioxide ($CO_2$) in the supercritical state, in a way strictly identical to that described in Example 2.

On conclusion of this first step, the catalyst was analyzed: it comprised less than 0.3% by weight of free hydrocarbons and 1.5% by weight of carbon.

The "regetest" resulted in a time of 4 minutes.

The regenerated catalyst thus obtained exhibited a carbon content of 0.1% by weight and a specific surface of 172 m²/g.

The results obtained in Examples 1 to 6 above • are collated in the table below:

| Ex. | Catalyst | Step 1 | % by weight of free hydrocarbons after the 1st step | % by weight of carbon after the 1st step | Regetest (min) | Specific surface on conclusion of the regeneration (m²/g) |
|---|---|---|---|---|---|---|
| 1 | CoMo on alumina, spent | Evaporation under nitrogen | <0.3 | 11.9 | 29 | 138 |
| 2 | CoMo on alumina, spent | Washing with supercritical $CO_2$ | <0.3 | 11.1 | 17 | 190 |
| 3 | Zeolite, spent | Evaporation under nitrogen | <0.3 | 9.4 | 82 | 295 |
| 4 | Zeolite, spent | Washing with supercritical $CO_2$ | <0.3 | 9.1 | 65 | 299 |
| 5 | NiMo on alumina, semi-fresh | Evaporation under nitrogen | <0.3 | 5.5 | 12 | 170 |
| 6 | NiMo on alumina, semi-fresh | Washing with supercritical $CO_2$ | <0.3 | 1.5 | 4 | 172 |

The above results demonstrate that the process according to the present invention makes it possible to carry out the step of combustion of the coke under substantially milder conditions, that is to say over significantly shortened periods of time.

It is also possible to benefit from this to carry out the combustion of the coke over a time identical to that of the comparative processes but at a lower temperature.

These advantages make possible, in addition to a significant saving in energy, a better restoration of the activity of the catalyst.

The invention claimed is:

1. A process for the off site regeneration of a solid catalyst, comprising the following two consecutive steps:
    a first step of washing the catalyst using a fluid in the supercritical state, so as to extract from the catalyst at least a portion of the hydrocarbons present at the surface of the latter, followed by
    a second step of combustion of at least a portion of the coke present at the surface of the catalyst by a heat treatment of the latter in the presence of oxygen and at a temperature ranging from 300° C. to 600° C., wherein said fluid in the supercritical state is carbon dioxide comprising water.

2. A process for the off site regeneration of a solid catalyst, comprising the following two consecutive steps:
   a first step of washing the catalyst using one or more fluids in the supercritical state, so as to extract from the catalyst at least a portion of the hydrocarbons present at the surface of the latter, followed by
   a second step of combustion of at least a portion of the coke present at the surface of the catalyst by a heat treatment of the latter in the presence of oxygen and at a temperature ranging from 300° C. to 600° C., wherein at least one of said fluids in the supercritical state is water.

3. The process according to claim 1 or claim 2, characterized in that the fluid in the supercritical state is employed pure or as a mixture with one or more cosolvent(s) and/or additive(s), in order to vary its extractive power for the hydrocarbons.

4. The process according to claim 1 or claim 2, characterized in that the first step is carried out by circulating an amount of fluid in the supercritical state, expressed as the ratio of the hourly flow rate by weight of the fluid in the supercritical state to the weight of catalyst, of between 10 and 3000 $h^{-1}$.

5. The process according to claim 1 or claim 2, characterized in that the second step is carried out, in all or in part, at a temperature ranging from 350° C. to 550° C.

6. The process according to claim 1 or claim 2, characterized in that the second step is continued until a carbon content of the catalyst of less than or equal to 2% by weight, with respect to the total weight of the catalyst, is obtained.

7. The process according to claim 1 or claim 2, characterized in that it does not comprise a preliminary step of stripping the catalyst by washing the latter using a stream of gas.

8. The process according to claim 1 or claim 2, characterized in that the catalyst to be regenerated comprises from 1 to 40% by weight of hydrocarbons, with respect to the total weight of the catalyst.

9. The process according to claim 1 or claim 2, characterized in that the catalyst is a catalyst for the treatment and/or conversion of hydrocarbons.

10. The process according to claim 1, wherein said fluid in the supercritical state is carbon dioxide comprising at least 1% by weight of water.

11. The process according to claim 1, wherein said fluid in the supercritical state is carbon dioxide comprising from 1 to 15% by weight of water.

12. The process according to claim 1, characterized in that the first step is carried out at a temperature of greater than or equal to 31° C. and at a pressure of greater than or equal to 7.38 MPa.

13. The process according to claim 1, characterized in that the first step is carried out at a temperature ranging from 35 to 250° C.

14. The process according to claim 1, characterized in that the first step is carried out at a pressure ranging from 7.5 to 60 MPa.

15. The process according to claim 2, characterized in that the first step is carried out at a temperature of greater than or equal to 374° C. and at a pressure of greater than or equal to 22.1 MPa.

16. The process according to claim 4, characterized in that the first step is carried out by circulating an amount of fluid in the supercritical state, expressed as the ratio of the hourly flow rate by weight of the fluid in the supercritical state to the weight of catalyst, of between 100 and 1000 $h^{-1}$.

17. The process according to claim 9, characterized in that the catalyst is a catalyst for the hydrotreating and/or hydroconversion of hydrocarbons.

18. The process according to claim 1, characterized in that the first step is carried out at a temperature ranging from 50 to 100° C.

19. The process according to claim 1, characterized in that the first step is carried out at a pressure ranging from 8 to 40 MPa.

20. The process according to claim 1, characterized in that the first step is carried out at a pressure ranging from 8 to 20 MPa.

* * * * *